(12) United States Patent
Dasgupta et al.

(10) Patent No.: US 11,328,326 B2
(45) Date of Patent: May 10, 2022

(54) METHOD AND SYSTEM FOR TARGETED ADVERTISING IN AN OVER-THE-TOP (OTT) ECOSYSTEM

(71) Applicant: Tata Consultancy Services Limited, Mumbai (IN)

(72) Inventors: Punyabrota Dasgupta, Thane (IN); Kamal Bhadada, Santa Clara, CA (US); Sanjeev Goyal, Thane (IN); Titash Sarkar, Thane (IN); Ritika Tripathi, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 81 days.

(21) Appl. No.: 16/728,634

(22) Filed: Dec. 27, 2019

(65) Prior Publication Data
US 2020/0211061 A1 Jul. 2, 2020

(30) Foreign Application Priority Data
Dec. 31, 2018 (IN) .......................... IN201821049991

(51) Int. Cl.
*G06Q 30/00* (2012.01)
*G06Q 30/02* (2012.01)
*G06N 3/08* (2006.01)
*G06Q 50/00* (2012.01)
G05B 19/418 (2006.01)
G06N 3/04 (2006.01)

(52) U.S. Cl.
CPC .......... *G06Q 30/0269* (2013.01); *G06N 3/08* (2013.01); *G06Q 30/0252* (2013.01); *G06Q 30/0255* (2013.01); *G06Q 50/01* (2013.01); G06N 3/04 (2013.01)

(58) Field of Classification Search
CPC .......... G06Q 30/0269; G06Q 30/0252; G06Q 50/01; G06Q 30/0255; G06N 3/08; G06N 3/04
See application file for complete search history.

(56) References Cited

U.S. PATENT DOCUMENTS 9,924,210 B2   3/2018   Burke
9,980,010 B2   5/2018   Ray et al.
(Continued)

OTHER PUBLICATIONS

- "Predicting demographic attributes from web usage: Purpose and methodologies". IEEE. 2017. (Year: 2017).*

*Primary Examiner* — Maria V Vanderhorst
(74) *Attorney, Agent, or Firm* — Finnegan, Henderson, Farabow, Garrett & Dunner LLP (57) ABSTRACT

This disclosure relates generally to a system and method to recommend a targeted advertisement to a user. The system is configured to receive and pre-processes a plurality of data from various sources based on a set of predefined business rules. A set of training data is extracted from the pre-processed plurality of data to develop a machine learning model to identify a set of attributes of personality of the user. A neural network is trained to identify at least one classifier to define one or more needs of the user. It would be appreciated that the one or more needs of the user are mapped with the set of attributes of the personality. Finally, the recommendation module of the system recommends at least one advertisement to a media service provider to share the same over OTT to the user.

5 Claims, 4 Drawing Sheets

(56) References Cited

U.S. PATENT DOCUMENTS

| | | | |
|---|---|---|---|
| 2014/0108308 A1* | 4/2014 | Stout | G06N 3/08 |
| | | | 706/12 |
| 2015/0046568 A1 | 2/2015 | Mantin | |
| 2017/0019496 A1* | 1/2017 | Orbach | G06Q 30/06 |
| 2017/0034591 A1 | 2/2017 | Ray et al. | |
| 2017/0034592 A1 | 2/2017 | Ray et al. | |
| 2018/0349484 A1* | 12/2018 | Carlisle | G06Q 30/0217 |
| 2019/0005359 A1* | 1/2019 | Wilf | G06K 9/6256 |
| 2020/0327378 A1* | 10/2020 | Smith | G06N 5/048 |

* cited by examiner

METHOD AND SYSTEM FOR TARGETED ADVERTISING IN AN OVER-THE-TOP (OTT) ECOSYSTEM

CROSS-REFERENCE TO RELATED APPLICATIONS AND PRIORITY

This U.S. patent application claims priority under 35 U.S.C. § 119 to India Application No. 201821049991, filed on Dec. 31, 2018.

TECHNICAL FIELD

The disclosure herein generally relates to a field of over-the-top (OTT) media communication and, more particularly, a system and method for targeted advertising in an over-the-top (OTT) ecosystem.

BACKGROUND

In the world of television, the primary source of revenue for the broadcasters or cable-company has been through advertisements and sponsorships in most of the markets. While the market size of television advertising is in the order of trillions of dollars, there has been a pertinent challenge on one hand how effectively target various television advertisements beyond a basic demographic segmentation. On the other hand, the last few years have been seen the adoption and evolution of internet protocol (IP) based content delivery. It contains IP enabled set top boxes, or dongle devices or over the top apps on mobile. It would be appreciated that they all have one thing in common i.e. a feedback loop. It is possible to learn and know what the viewer is watching, when they are watching, where they are watching, how they are watching etc. and with a parallel milestone in the space of cloud computing and artificial intelligence, it is also possible to infer why they are watching advertisements of a specified category of content.

In developing markets where traditional broadcasters going the OTT route, attractive subscription models (mix of paid and advertisement), still keeps the advertising business relevant and with strong indicators of massive transformation. The classical perception of television advertisement has always been a "distraction" from the core content programming. However, the alternate hypothesis also exists showing the right advertisement to the right person at the right point in time, is likely to create a positive impact with high chances of conversion.

Thus, solutions or platforms that enable sharing a right advertisement to a right person at the right point in time, is likely to create a positive impact with high chances of conversion.

SUMMARY

Embodiments of the present disclosure provides technological improvements as solutions to one or more of the above-mentioned technical problems recognized by the inventors in conventional systems. For example, in one embodiment, a method and system to analyze personality, and needs of a user to recommend a targeted advertisement to the user. It would be appreciated that the determination of the personality traits, and needs of the user can be a vital input to a recommendation module to recommend a targeted advertisement for best exploitation of impulse, immediate needs or general personality traits of the user.

In one aspect the embodiments provide herein a method to analyze personality and needs of a user to recommend a targeted advertisement to the user. The method comprises one or more steps as receiving a plurality of data from one or more sources with a prior permission of the user, pre-processing the received plurality of data from the one or more sources based on a set of predefined parameters, extracting a set of training data from the pre-processed plurality of data to develop a machine learning model to identify a personality of the user, analyzing the identified set of attributes of the personality to determine nature of interactivity of the user with the content of the set of past transactions, Identifying at least one classifier from the extracted set of training data using a neural network, wherein the at least one classifier defines one or more needs of the user and finally recommending at least one advertisement over OTT to the user by an advertisement content provider based on the identified at least one classifier.

In another aspect the embodiment provides herein a system to analyze personality and needs of a user to recommend a targeted advertisement to the user. The system comprising at least one memory storing a plurality of instructions and one or more hardware processors communicatively coupled with the at least one memory. The one or more hardware processors are configured to execute one or more modules comprises of a receiving module, a pre-processing module, an extraction module, an analyzing module, an identification module, and a recommendation module.

The system is configured to receive and pre-process a plurality of data from various sources based on a set of predefined business rules. A set of training data is extracted to develop a machine learning model to identify a set of attributes of personality of the user. A neural network is used to identify at least one classifier to define one or more needs of the user. It would be appreciated that the one or more needs of the user are mapped with the set of attributes of the personality. Finally, the recommendation module of the system recommends at least one advertisement over OTT to the user.

In yet another aspect the embodiments provide herein computer readable medium storing one or more instructions which when executed by a processor on a system, cause the processor to analyze personality and needs of a user to recommend a targeted advertisement to the user. The one or more instructions comprising receiving a plurality of data from one or more sources with a prior permission of the user, pre-processing the received plurality of data from the one or more sources based on a set of predefined parameters, extracting a set of training data from the pre-processed plurality of data to develop a machine learning model to identify a personality of the user, analyzing the identified set of attributes of the personality to determine nature of interactivity of the user with the content of the set of past transactions, Identifying at least one classifier from the extracted set of training data using a neural network, wherein the at least one classifier defines one or more needs of the user and finally recommending at least one advertisement over OTT to the user by an advertisement content provider based on the identified at least one classifier.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system to analyze personality and needs of a user to recommend a targeted advertisement. It would be appreciated that the classification of a human personality is being loosely based on the popular five factors. The key attributes of the personality are being characterized as an openness to experience, a conscientiousness, an extroversion, an agreeableness, and a neuroticism. It may be noted that the above named attributes of the personality are not a complete list of its own and it may be extended for other personality traits as may be suitable for the target demography under consideration.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
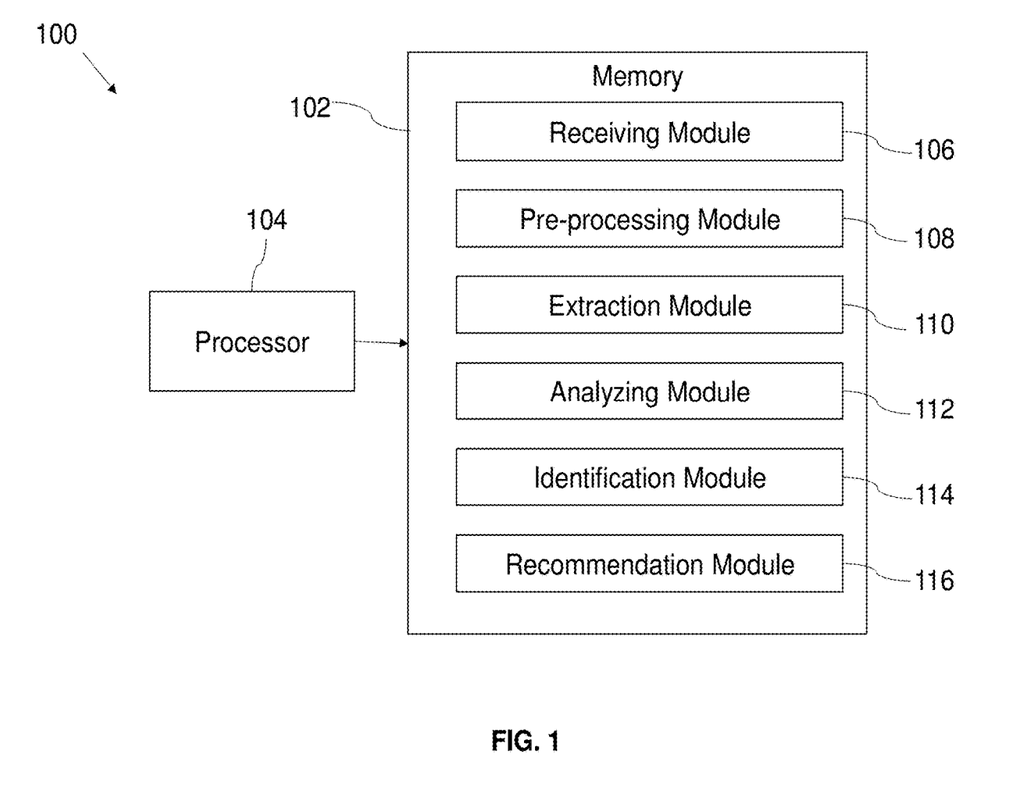
FIG. 1 illustrates a system to analyze personality, and needs of a user to recommend a targeted advertisement, in accordance with some embodiments of the present disclosure

Referring FIG. 1, wherein the system (100) is configured to analyze personality and needs of a user to recommend a targeted advertisement. The system is configured to receive a plurality of data from one or more sources with a prior permission of the user. The plurality of data includes a set of past transactions which has relation with behavior of the user. A set of training data is extracted to develop a neural network model to identify the attributes of the personality of the user and to determine nature of interactivity of the user with the content of the set of past transactions.

In the preferred embodiment, the system (100) comprises at least one memory (102) with a plurality of instructions and one or more hardware processors (104) which are communicatively coupled with the at least one memory (102) to execute modules therein.

The hardware processor (104) may be implemented as one or more microprocessors, microcomputers, microcontrollers, digital signal processors, central processing units, state machines, logic circuitries, and/or any devices that manipulate signals based on operational instructions. Among other capabilities, the hardware processor (104) is configured to fetch and execute computer-readable instructions stored in the memory (102).

In the preferred embodiment of the disclosure, a receiving module (106) of the system (102) is configured to receive a plurality of data from one or more sources with a prior permission of the user. The plurality of data herein includes a set of past transactions and each answer of one or more questions to the user. A closed group of users is surveyed with a set of questions pertaining to personality traits.

In another embodiment, the set of data is extracted pertaining to the content being viewed by each of the user. The content metadata and the quality of experience and the CDN data is being all aggregated together to define a set of features pertaining to the media consumption behavior. Furthermore, if the content being viewed is packaged with advertisement support, relevant features can also be if the channel switch coincided with the ad-break window in particular channel, or the advertisement being skipped or audio is muted during the ad-break.

In the preferred embodiment of the disclosure, the pre-processing module (108) of the system (100) is configured to pre-processing the received plurality of data from one or more sources based on set of predefined business rules.

In the preferred embodiment of the disclosure, the extraction module (110) of the system (100) is configured to extract a set of training data from the pre-processed plurality of data to develop a machine learning model to identify a set of attributes of personality of the user, wherein the personality of the user is a set of predefined attributes.

In the preferred embodiment of the disclosure, the analyzing module (112) of the system (100) is configured to analyze the identified set of attributes of the personality to determine nature of interactivity of the user with the content of the set of past transactions.

In the preferred embodiment of the disclosure, the identification module (114) of the system (100) is configured to identify at least one classifier from the extracted set of training data using a neural network, wherein the at least one classifier defines one or more needs of the user, wherein the one or more needs of the user are mapped with the set of predefined attributes of the personality. For example, consider three different classifiers which are being used to:

Classify the socio-economic segment which a user belongs to;

Classify the dominant personality traits captured from viewing and social media behavior; and Classify the dominant human needs based on analysis of the content which the user is viewing.

All the attributes around socio-economic segment, behavior, personality, human needs are captured through industry standard terms and is being assigned a value in the range of 0 to 1.

Figure 2:
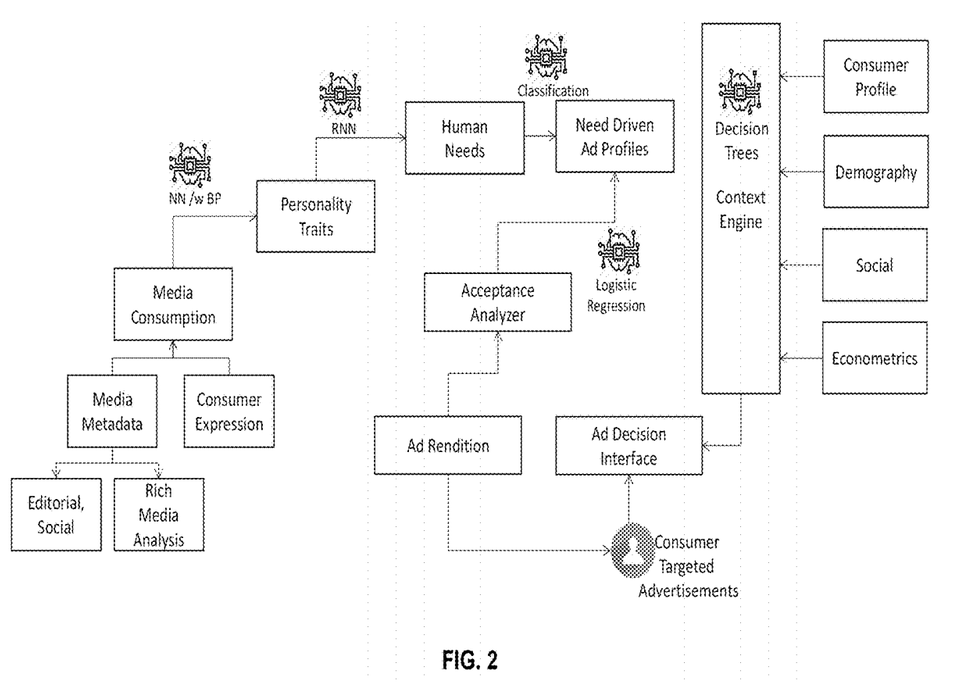
FIG. 2 is a schematic architecture explains the overall mechanism to profile an individual consumer based on the needs and personality traits to infer on the advertisement which may be delivered to them, in accordance with some embodiments of the present disclosure.

Referring FIG. 2, an example, a schematic architecture explains the overall mechanism to profile an individual consumer based on the needs and personality traits to infer on the advertisement which may be delivered to them. A typical subscription package over OTT is comprised of video on demand, linear channel payout, and pay per view or a live broadcast. The consumer avails the package and consume it over multichannel, multiplatform devices, locations etc. The system is configured to identify a set of attributes to capture how a content is being consumed. It can be a watched real time, watched catch-up, repetitions, watched full length, range of devices, lean back, lean forward, on the move, shared on social network, commented, saved for later view etc. It would be appreciated that the privacy laws across the geographies permitting analysis of social media streams from Facebook, Twitter, Instagram to capture media preferences, general personality traits, interactivity on social media which watching a live event or sports.

Figure 3:
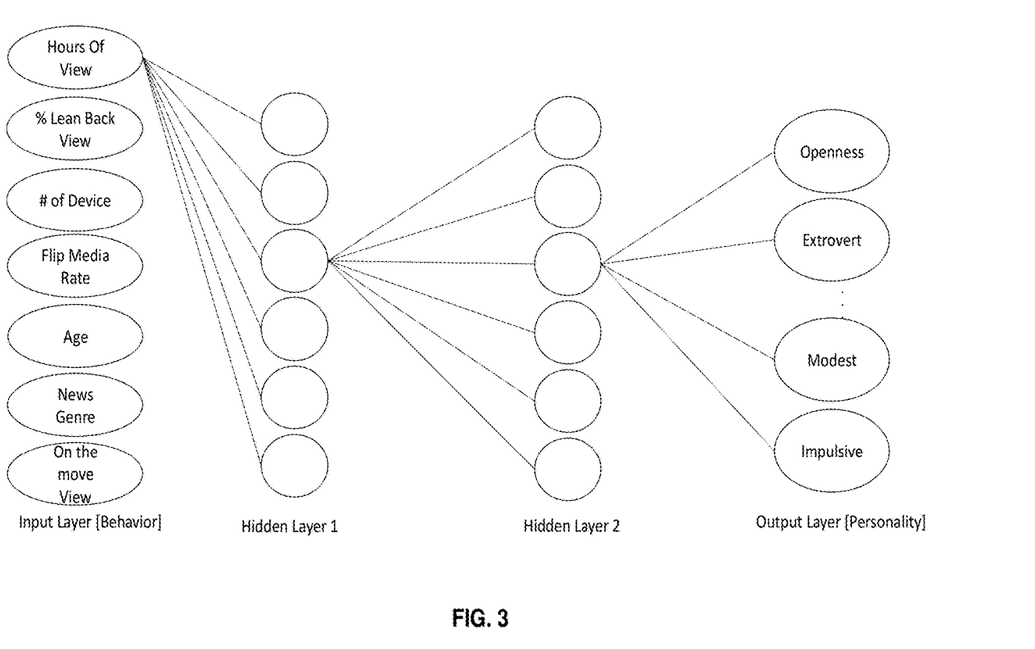
FIG. 3 is a schematic architecture presents a neural network with hidden layers is being used to identify at least one classifier from the extracted set of training data, in accordance with some embodiments of the present disclosure.

Referring FIG. 3, as an example, a schematic of the neural network with hidden layers is being used to identify at least one classifier from the extracted set of training data. All the media viewing behavior are being considered as predictor variables and are a part of the input layer. On the other hand, the one or more attributes of the personality are part of output layer neuron. There are two hidden layers which are being considered for this. The neural network is being trained on the data available and once the model is ready, the neural network would run the classification and produce an output which is the scores for each attribute of the personality. The dominant attribute of the personality will be mapped with the one or more needs of the user before recommending the advertisement to the user.

In the preferred embodiment of the disclosure, the recommendation module (116) of the system (100) is configured to recommend at least one advertisement over OTT to the user. The at least one advertisement is mapped with the one or more needs and the set of predefined attributes of the personality of the user, further wherein the at least one advertisement is shared by an advertisement content provider based on the identified at least one classifier.

Figure 4:
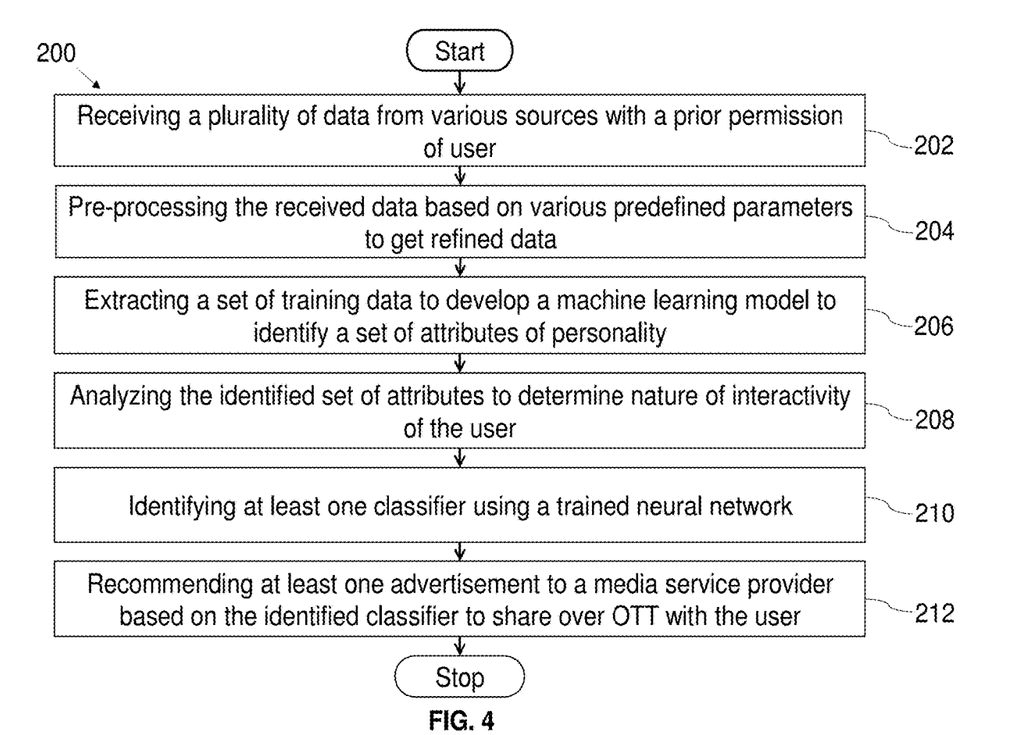
FIG. 4 is a flow diagram to illustrate a method to analyze personality and needs of a user to recommend a targeted advertisement, in accordance with some embodiments of the present disclosure.

Referring FIG. 4, a processor-implemented method (200) to analyze personality and needs of a user to recommend a targeted advertisement. The method comprises one or more steps as follows. Initially, it receive and pre-process a plurality of data from various sources based on a set of predefined business rules. A set of training data is extracted to develop a machine learning model to identify a set of attributes of personality of the user. A neural network is used to identify at least one classifier to define one or more needs of the user. It would be appreciated that the one or more needs of the user are mapped with the set of attributes of the personality. Finally, the recommendation module of the system recommends at least one advertisement over OTT to the user.

Initially, at the step (202), a plurality of data is received at a receiving module (106) of the system (100) from one or more sources with a prior permission of the user. The plurality of data herein includes a set of past transactions and each answer of one or more questions to the user.

In the preferred embodiment of the disclosure, at the next step (204), pre-processing the received plurality of data from the one or more sources based on a set of predefined parameters at a pre-processing module (108) of the system (100).

In the preferred embodiment of the disclosure, at the next step (206), a set of training data is extracted at an extraction module (110) of the system (100) from the pre-processed plurality of data to develop a machine learning model to identify a personality of the user. It would be appreciated that the personality of the user is a set of predefined attributes.

In the preferred embodiment of the disclosure, at the next step (208), analyzing the identified set of attributes of the personality to determine nature of interactivity of the user with the content of the set of past transactions at an analyzing module (112) of the system (100).

In the preferred embodiment of the disclosure, at the step (210), at least one classifier from the extracted set of training data is identified at an identification module (114) of the system (100) using a neural network. It is to be noted that the identified at least one classifier defines one or more needs of the user, wherein the one or more needs of the user are mapped with the set of predefined attributes of the personality.

In the preferred embodiment of the disclosure, at the last step (212), recommending at least one advertisement over OTT to the user using a recommendation module (118) of the system (100). It should be noted that an advertisement content provider shares the recommended at least one advertisement which is mapped with one or more needs and the set of predefined attributes of the personality of the user.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem in existing technology or practice of recommending an advertisement over the top (OTT) primarily based on click streams or being captured from the set top box or any IP enabled devices. Embodiments herein provide a solution where the plurality of data from various sources is being used for personalized content. It captures a set of attributes of personality of the user which are also mapped with needs of the user.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method to recommend at least one targeted advertisement in an over-the-top (OTT) ecosystem, the method comprising:
    receiving, by one or more hardware processors, a plurality of data from one or more sources with a prior permission of a user, wherein the plurality of data includes a set of past transactions and each answer of one or more questions to the user, wherein the plurality of data pertains to media content being viewed by the user, and wherein the set of past transactions has relation with media consumption behavior of the user, wherein the one or more sources include social media streams data on social networking platforms, a first party billing and customer relationship management (CRM) data, a set top box and content of a live event and sports, and wherein the plurality of data is aggregated to define a set of features pertaining to the media consumption behavior of the user;
    pre-processing, by the one or more hardware processors, the received plurality of data from the one or more sources based on a set of predefined rules;
    extracting, by the one or more hardware processors, a set of training data from the pre-processed plurality of data to develop a machine learning model to identify a set of attributes of a personality of the user, wherein the personality of the user is a set of predefined attributes;
    analyzing, by the one or more hardware processors, the identified set of attributes of the personality of the user to determine nature of interactivity of the user with the media content of the set of past transactions;
    identifying, by the one or more hardware processors, at least one classifier from the extracted set of training data using a neural network, wherein the media consumption behavior of the user are considered as predictor variables for an input layer of the neural network and the set of predefined attributes of the personality of the user are part of the output layer of the neural network, wherein the neural network runs classification based on the extracted set of training data and outputs scores for each attribute in the predefined set of attributes of the personality of the user, and maps an attribute with a highest score with one or more requirements of the user; and
    recommending, by the one or more hardware processors, the at least one targeted advertisement over OTT to the user based on the identified at least one classifier, wherein the at least one targeted advertisement is tagged as per mapping of the one or more requirements and the set of predefined attributes of the personality of the user, thereby facilitating sharing of a personalized content to the user.

2. The method as claimed in claim 1, wherein the machine learning model is used to build an association between one or more characteristics of an advertisement content provider and the set of attributes of the personality of the user.

3. A system configured to recommend at least one targeted advertisement in an over-the-top (OTT) ecosystem, the system comprising:
    at least one memory storing a plurality of instructions;
    one or more hardware processors communicatively coupled with the at least one memory, wherein the one or more hardware processors are configured to execute one or more modules;
    a receiving module configured to receive a plurality of data from one or more sources with a prior permission of a user, wherein the plurality of data includes a set of past transactions and each answer of one or more questions to the user, wherein the plurality of data pertains to media content being viewed by the user, wherein the set of past transactions has relation with media consumption behavior of the user, wherein the one or more sources include social media streams data on social networking platforms, a first party billing and customer relationship management (CRM) data, a set top box and content of a live event and sports, and wherein the plurality of data is aggregated to define a set of features pertaining to the media consumption behavior of the user;

a pre-processing module configured to pre-process the received plurality of data from the one or more sources based on a set of predefined rules;

an extraction module configured to extract a set of training data from the pre-processed plurality of data to develop a machine learning model to identify a set of attributes of personality of the user, wherein the personality of the user is a set of predefined attributes;

an analyzing module configured to analyze the identified set of attributes of the personality of the user to determine nature of interactivity of the user with the media content of the set of past transactions;

an identification module configured to identify at least one classifier from the extracted set of training data using a neural network, wherein the media consumption behavior of the user are considered as predictor variables for an input layer of the neural network and the set of predefined attributes of the personality of the user are part of the output layer of the neural network, wherein the neural network runs classification based on the extracted set of training data and outputs scores for each attribute in the predefined set of attributes of the personality of the user, and maps an attribute with a highest score with one or more requirements of the user; and a recommendation module configured to recommend the at least one targeted advertisement over OTT to the user, wherein the at least one targeted advertisement is tagged as per mapping of the one or more requirements and the set of predefined attributes of the personality of the user, and wherein the at least one targeted advertisement is shared by an advertisement content provider based on the identified at least one classifier, thereby facilitating sharing of a personalized content to the user.

4. The system as claimed in claim 3, wherein the machine learning model is used to build an association between one or more characteristics of an advertisement content provider and the set of attributes of the personality of the user.

5. A non-transitory computer readable medium storing one or more instructions which when executed by a processor on a system, cause the processor to recommend at least one targeted advertisement in an over-the-top (OTT) ecosystem comprising:

receiving a plurality of data from one or more sources with a prior permission of a user, wherein the plurality of data includes a set of past transactions and each answer of one or more questions to the user, wherein the plurality of data pertains to media content being viewed by the user, wherein the set of past transactions has relation with media consumption behavior of the user, wherein the one or more sources include social media streams data on social networking platforms, a first party billing and customer relationship management (CRM) data, a set top box and content of a live event and sports, and wherein the plurality of data is aggregated to define a set of features pertaining to the media consumption behavior of the user;

pre-processing the received plurality of data from the one or more sources based on a set of predefined rules;

extracting a set of training data from the pre-processed plurality of data to develop a machine learning model to identify a set of attributers of a personality of the user, wherein the personality of the user is a set of predefined attributes;

analyzing the identified set of attributes of the personality of the user to determine nature of interactivity of the user with the media content of the set of past transactions;

identifying at least one classifier from the extracted set of training data using a neural network, wherein the media consumption behavior of the user are considered as predictor variables for an input layer of the neural network and the set of predefined attributes of the personality of the user are part of the output layer of the neural network, wherein the neural network runs classification based on the extracted set of training data and outputs scores for each attribute in the predefined set of attributes of the personality of the user, and maps an attribute with a highest score with one or more needs requirements of the user; and recommending the at least one targeted advertisement to over OTT to the user based on the identified at least one classifier, wherein the at least one targeted advertisement is tagged as per mapping of the one or more requirements and the set of predefined attributes of the personality of the user, thereby facilitating sharing of a personalized content to the user.

\* \* \* \* \*